April 10, 1956 H. J. HOSEASON 2,741,117
CELLULAR FLOOR STRUCTURE FOR AN ELECTRICAL
WIRE DISTRIBUTING SYSTEM
Filed Aug. 19, 1952

INVENTOR.
Harry J. Hoseason
BY
Attorney.

United States Patent Office 2,741,117
Patented Apr. 10, 1956

2,741,117
CELLULAR FLOOR STRUCTURE FOR AN ELECTRICAL WIRE DISTRIBUTING SYSTEM

Harry J. Hoseason, Toronto, Ontario, Canada

Application August 19, 1952, Serial No. 305,158

1 Claim. (Cl. 72—16)

This invention relates to electrical wire feeder ducts for cellular floors and to a floor construction embodying the same.

An object of the invention is to provide a feeder duct of simple construction and convenient installation, and which has a generally uninterrupted exterior upper web surface and a low overall height whereby the duct may readily be incorporated in a floor structure with such exterior upper web surface in substantially flush relation with the floor fill. The duct of the present invention does not therefore require to be buried in the floor fill and is readily accessible without drilling.

Figure 1:
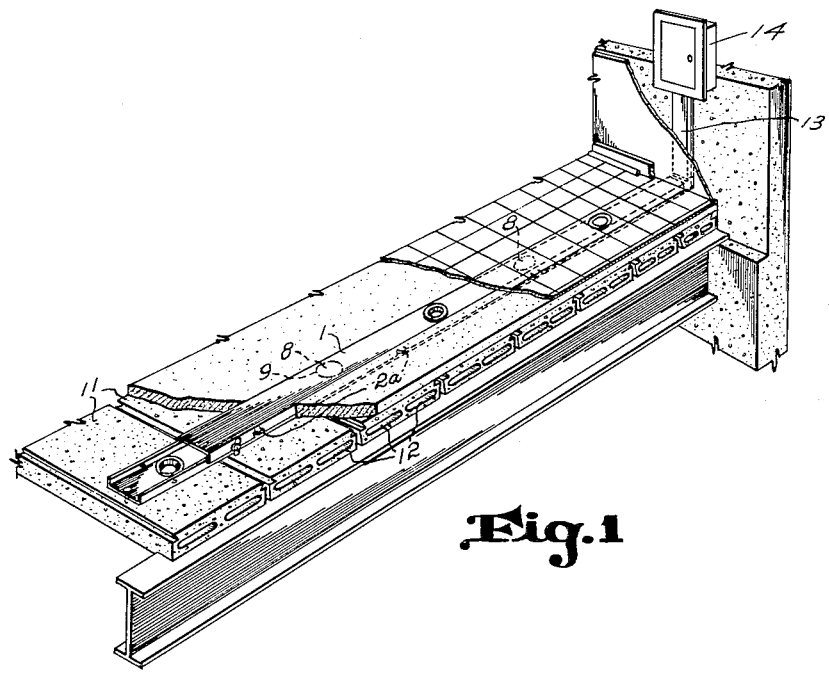
Figure 3:
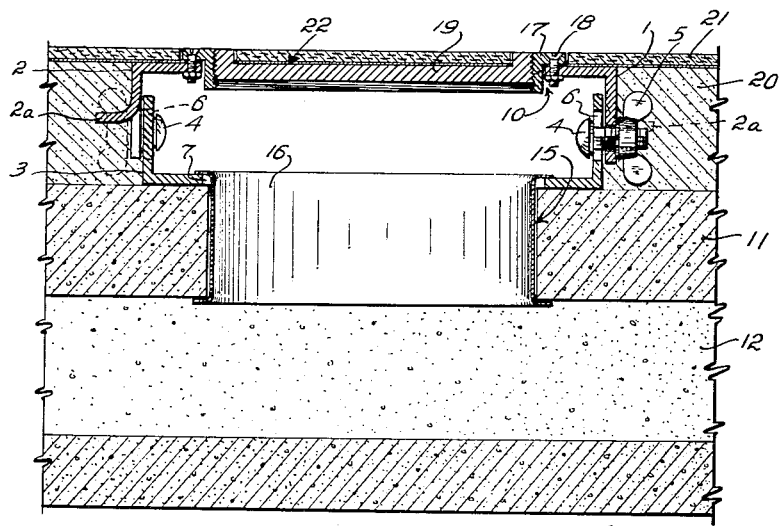
Figure 2:
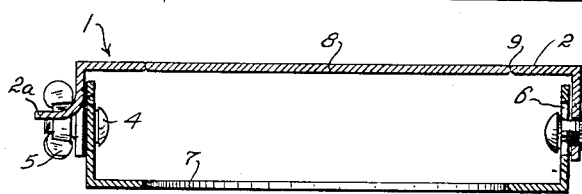

The invention will be described with reference to the accompanying drawing, in which, Figure 1 is a perspective view, partly in section, of a floor construction in accordance with the present invention, Figure 2 is a transverse section of a feeder duct constructed in accordance with the invention, and Figure 3 is a partial transverse sectional view of the floor structure shown in Fig. 1.

In the drawing, the feeder duct 1 comprises a pair of upper and lower channel-shaped members 2 and 3 having overlapping flanges connected together by bolts 4 and wing nuts 5. It will be observed that the height of the duct may be adjusted as desired by loosening nuts 5 and moving members 2 and 3 relatively to each other, such movement being permitted by slots 6 in the flange of member 3 and in which the bolts 4 may slide. The upper and lower exterior surfaces of the webs of members 2 and 3 are plane and uninterrupted to reduce the overall height of the duct and facilitate the subsequent floor construction.

Member 3 has a plurality of holes 7 in its web portion and member 2 has a plurality of knockout portions 8 in its web portion. Each knockout portion 8 is located in directly opposite relation to a hole 7 and is formed in the usual manner by partially severing the web along the line 9. It will be apparent that each portion 8 may be knocked out to form a handhole 10 in the upper wall of the duct. Since hole 7 is directly opposite a handhole 10, access through each hole 7 is thereby provided by forming a respective handhole 10 as required. Anchoring lugs 2a are struck outwardly from the side walls of member 2.

In use, the duct is laid over a cellular floor fabricated of slabs 11 having cells 12 therein. The duct extends transversely of the cells 12 to provide a feeder means for each of the cells it traverses. The feeder duct is connected to a wall duct 13 and a conventional panel box 14 for electrical wiring.

Communication between the duct and any desired cell 12 is provided by drilling a hole 15 through the slab in registry with a hole 7 and applying a metal grommet 16 to the edge portions of the registering holes 7 and 15 to provide a smooth wall finish on the so-formed communication passage and to secure the duct in place on the slab.

Access to such passage is provided by knocking out the opposed portion 8. The handhole 10 so formed is provided with a threaded ring 17 secured to the edge of the hole as indicated at 18 and arranged to receive a threaded cover disc 19, which may be conveniently removed and applied as desired.

The floor is then provided with the customary top fill 20 of cementitious or like material, the upper surface of which is preferably flush with that of member 2. The anchoring lugs 2a become embedded in the fill and rigidly anchor the duct in place.

A floor covering 21, such as linoleum, tile or the like, is then laid over the fill and duct. Preferably, disc 19 is centrally recessed at 22 to receive the covering 21. Thus, only a minor portion of the closure for each handhole 10 is visible to render such closure inconspicuous.

In accordance with usual practice, electrical feeder wires are laid in duct 1 and connection therewith is made as desired with wires in the transversely extending cells 12, from which required floor outlets are made.

The duct described is readily adjustable as to height and since in addition its upper and lower web surfaces are uninterrupted, the height of the installed duct is reduced to a minimum. Thus, not only is the thickness of fill 20 reduced considerably, but access to the duct is convenient at all times without drilling through the top fill.

What is claimed is:

In a cellular floor structure including a plurality of cementitious slabs arranged side by side in substantially a coplanar relation and having cells extending therethrough parallel to the sides of said slabs, a feeder duct seated on said slabs transversely of said cells, said duct comprising an upper channel member having a web and two depending flange portions and a lower channel member having a web and two upstanding flange portions, the flange portions of said channel members being overlapped and initially vertically slidable with respect to each other, the web of said lower channel member having a substantially planar exterior lower surface extending from end to end of said lower channel member engaging said slabs and having a plurality of openings therein each directly above one of said cells, one of said openings registering with a passage in the upper portion of one of said slabs extending to the cell therebelow, the web of said upper channel member having a substantially planar exterior upper surface and having a plurality of knockout portions each directly above one of said openings, and adjustable means securing together said overlapped flange portions whereby the vertical position of the upper channel member with respect to the lower channel member may be set initially as desired, said securing means being entirely disposed between the planes of said lower and upper exterior surfaces, and a cementitious filling extending continuously over said slabs and having its upper surface flush with said upper surface of said upper channel member.

References Cited in the file of this patent

UNITED STATES PATENTS

| 1,592,548 | Walker | July 13, 1926 |
| 1,893,268 | Boucher | Jan. 3, 1933 |
| 2,081,197 | Goeller | May 25, 1937 |
| 2,259,674 | Wiesmann | Oct. 21, 1941 |
| 2,445,197 | Wiesmann | July 13, 1943 |

FOREIGN PATENTS

| 494,594 | Great Britain | Oct. 28, 1938 |